United States Patent
Larsen et al.

(10) Patent No.: US 9,217,591 B2
(45) Date of Patent: Dec. 22, 2015

(54) METHOD FOR CONTROLLING A FLOW OF REFRIGERANT TO AN EVAPORATOR

(75) Inventors: Lars Finn Sloth Larsen, Sydals (DK); Claus Thybo, Soenderborg (DK)

(73) Assignee: Danfoss A/S, Nordborg (DK)

( * ) Notice: Subject to any disclaimer, the term of this patent is extended or adjusted under 35 U.S.C. 154(b) by 1080 days.

(21) Appl. No.: 13/062,095

(22) PCT Filed: Sep. 4, 2009

(86) PCT No.: PCT/DK2009/000200
§ 371 (c)(1),
(2), (4) Date: May 20, 2011

(87) PCT Pub. No.: WO2010/025730
PCT Pub. Date: Mar. 11, 2010

(65) Prior Publication Data
US 2011/0214438 A1    Sep. 8, 2011

(30) Foreign Application Priority Data

Sep. 5, 2008  (DK) ................................. 2008 01235

(51) Int. Cl.
*F25B 41/04* (2006.01)
*F25B 41/06* (2006.01)

(52) U.S. Cl.
CPC ....... *F25B 41/062* (2013.01); *F25B 2341/0652* (2013.01); *F25B 2600/21* (2013.01); *F25B 2600/2521* (2013.01); *Y02B 30/72* (2013.01)

(58) Field of Classification Search
CPC ........... F25B 2600/2513; F25B 41/062; F25B 2341/063
USPC .................................. 62/222, 224, 225, 528
See application file for complete search history.

(56) References Cited

U.S. PATENT DOCUMENTS

| | | | | |
|---|---|---|---|---|
| 4,674,292 A | * | 6/1987 | Ohya et al. ...................... | 62/223 |
| 5,157,934 A | | 10/1992 | Uchida | |
| 5,402,652 A | * | 4/1995 | Alsenz ............................ | 62/222 |
| 5,425,246 A | * | 6/1995 | Bessler .......................... | 62/211 |
| 2007/0175229 A1 | * | 8/2007 | Redlich .......................... | 62/225 |

FOREIGN PATENT DOCUMENTS

| | | |
|---|---|---|
| EP | 1956323 A2 | 8/2008 |
| JP | 8-005164 A | 1/1996 |
| WO | 2008/024110 A | 2/2008 |

OTHER PUBLICATIONS

International search report for PCT/DK2009/000200 dated Feb. 3, 2010.

* cited by examiner

*Primary Examiner* — M. Alexandra Elve
*Assistant Examiner* — Henry Crenshaw
(74) *Attorney, Agent, or Firm* — McCormick, Paulding & Huber LLP

(57) ABSTRACT

A refrigeration system includes an expansion valve and a compressor, the expansion valve, the evaporator and the compressor being arranged in a refrigerant flow path having refrigerant flowing therein. A method for controlling a flow of refrigerant to an evaporator includes steps of increasing an opening degree of the expansion valve, thereby increasing a flow of refrigerant to the evaporator sufficiently to substantially eliminate a dry zone of the evaporator, decreasing the opening degree of the expansion valve, and repeating the steps of increasing and decreasing. This causes the superheat value of refrigerant leaving the evaporator to 'toggle' between a zero level and a low, but positive, level. Thereby the refrigeration capacity is utilized more efficiently. Additionally, sufficiently low amount of liquid refrigerant is allowed to pass through the evaporator to prevent damage to the compressor.

6 Claims, 3 Drawing Sheets

METHOD FOR CONTROLLING A FLOW OF REFRIGERANT TO AN EVAPORATOR

CROSS REFERENCE TO RELATED APPLICATIONS

This application is entitled to the benefit of and incorporates by reference essential subject matter disclosed in International Patent Application No. PCT/DK2009/000200 filed on Sep. 4, 2009, Danish Patent Application No. PA 2008 01235 filed on Sep. 5, 2008.

FIELD OF THE INVENTION

The present invention relates to a method for controlling a flow of refrigerant to an evaporator which is arranged in a refrigeration system. The method of the present invention allows the refrigeration system to be controlled in a manner which ensures that the refrigerating capacity of the evaporator is utilized more efficiently than it is the case when using prior art methods.

BACKGROUND OF THE INVENTION

Refrigeration systems are often operated by adjusting a degree of opening of an expansion valve and/or by opening/closing an expansion valve, thereby controlling the amount of liquid refrigerant being supplied to an evaporator. It is desirable to control the expansion valve in such a manner that it is obtained that all of the liquid refrigerant which is supplied to the evaporator is evaporated before exiting the evaporator, and in such a manner that mixed phase refrigerant is present at or immediately before the outlet of the evaporator. In the case that liquid refrigerant is allowed to exit the evaporator there is a risk that this liquid refrigerant reaches the compressor, and this may in some cases cause damage to the compressor. On the other hand, in the case that the liquid refrigerant evaporates while passing the first part of the evaporator, then the refrigeration capacity of the evaporator is not utilised to the full extent.

The superheat of the refrigerant provides information as to whether or not the situation described above has been obtained. Superheat is normally defined as the difference between the actual temperature of a fluid and the boiling point of the fluid. Accordingly, the superheat depends on the temperature as well as the pressure of the fluid. Thus, the superheat is a suitable parameter for controlling the opening degree of the expansion valve. It is normally desired that the refrigerant has a low, but positive, superheat. When this is the case, the situation described above is obtained, i.e. the refrigeration capacity of the evaporator is utilised to the greatest possible extent, and the risk of causing damage to the compressor due to liquid refrigerant being passed through the evaporator is minimised.

Thus, the superheat value of the refrigerant leaving the evaporator should, ideally, be zero. However, when the superheat value is zero it is impossible to know whether the evaporator is operating in an optimal manner, i.e. the liquid refrigerant is exactly evaporated in the evaporator, or whether a large amount of liquid refrigerant is passing through the evaporator. Therefore, in most prior art refrigeration systems the opening degree of the expansion valve is controlled in such a manner a positive superheat, e.g. of approximately 5-10 K, is maintained. Thereby it is ensured that no liquid refrigerant is allowed to pass through the evaporator. However, this has the consequence that the refrigeration capacity of the evaporator is not fully utilised.

In A. Tambovtsev and H. Quack, "COP Improvements by Transfer of the Superheating into the Internal Heat Exchanger", ICR07-B2-1406, describes a refrigeration system and a method of controlling a refrigeration system. The refrigeration system has been provided with an additional internal heat exchanger which ensures that liquid refrigerant which has been allowed to pass through the evaporator is evaporated before it reaches the compressor. Thereby a slightly wet outlet is obtained, and the entire heat transfer area of the evaporator can, thus, be used for evaporating refrigerant, and the efficiency of the evaporator is improved. It is, however, a disadvantage that the solution suggested in this paper requires an additional heat exchanger, since this increases the costs of producing the refrigeration system, as well as the complexity of the system.

SUMMARY OF THE INVENTION

It is an object of the invention to provide a method for controlling a flow of refrigerant to an evaporator, wherein the method allows the refrigeration capacity of the evaporator to be utilised to a greater extent than it is the case in prior art control methods.

It is a further object of the invention to provide a method for controlling a flow of refrigerant to an evaporator, wherein an increased utilisation of the refrigeration capacity of the evaporator is obtained without risking damage to the compressor.

It is an even further object of the invention to provide a method for controlling a flow of refrigerant to an evaporator, the method allowing the component count and the complexity of the refrigeration system to be reduced.

According to the invention the above and other objects are fulfilled by providing a method for controlling a flow of refrigerant to an evaporator arranged in a refrigeration system, the refrigeration system further comprising an expansion valve and a compressor, the expansion valve, the evaporator and the compressor being arranged in a refrigerant flow path having refrigerant flowing therein, the method comprising the steps of:

increasing an opening degree of the expansion valve, thereby increasing a flow of refrigerant to the evaporator sufficiently to substantially eliminate a dry zone of the evaporator, decreasing the opening degree of the expansion valve after a period of time has lapsed, and repeating the steps of increasing and decreasing the opening degree of the expansion valve.

The refrigerant may be any suitable kind of refrigerant, e.g. selected from one of the following groups of refrigerants: HFC, HCFC, CFC or HC. Another suitable refrigerant is $CO_2$.

According to the method of the invention the opening degree of the expansion valve is initially increased. Increasing the opening degree of the expansion valve increases the flow of refrigerant supplied to the evaporator. The opening degree is increased by an amount and for a time interval which is sufficient to ensure that the flow of refrigerant to the evaporator is increased sufficiently to substantially eliminate a dry zone of the evaporator. This should be interpreted to mean that the boundary between the liquid/mixed refrigerant and the gaseous refrigerant is moved to the outlet of the evaporator, or even beyond the outlet, i.e. the refrigerant in the evaporator is in a liquid state or it is a mixture of liquid and gaseous refrigerant. Thereby the superheat value of the refrigerant leaving the evaporator is zero, and liquid refrigerant is most likely allowed to pass through the evaporator.

After a period of time has lapsed, the opening degree of the expansion valve is decreased, preferably to an opening degree which corresponds to the opening degree of the expansion valve prior to performing the step of increasing the opening degree of the expansion valve. Thus, the opening degree of the expansion valve is increased briefly, and then returned to the level which is dictated by the control strategy used for controlling the refrigeration system. This has the consequence that the flow of refrigerant to the evaporator is decreased sufficiently to establish a dry zone of the evaporator, i.e. liquid refrigerant is no longer allowed to pass through the evaporator. Thereby the superheat value of the refrigerant leaving the evaporator is increased to a low, but positive, value.

The steps of increasing and decreasing the opening degree are repeated, preferably multiple times. Thereby the opening degree of the expansion valve is 'pulsating'. The 'pulsating' opening degree of the expansion valve causes the superheat value of the refrigerant leaving the evaporator to 'toggle' between zero and a low, but positive, value. Thereby the average value of the refrigerant leaving the evaporator is decreased as compared to the situation where the superheat value is kept at a low, positive level constantly, because the superheat value is periodically allowed to decrease to the zero level. Thereby the refrigerating capacity of the evaporator is utilised more efficiently, i.e. the refrigeration system is operated in a more efficient manner. Simultaneously, it is ensured that only a small amount of liquid refrigerant is allowed to pass through the evaporator, because the superheat value is only allowed to remain at the zero level for a short period of time before the opening degree of the expansion valve is once again decreased, thereby increasing the superheat to a positive value. Accordingly, the risk of causing damage to the compressor due to liquid refrigerant being passed through the evaporator is eliminated, or at least reduced considerably.

The opening degree of the expansion valve may be increased in such a manner that the flow of refrigerant is increased by 5%-15%, such as 7%-12%, such as approximately 10% of the flow of refrigerant prior to increasing the opening degree of the expansion valve.

The steps of increasing and decreasing the opening degree of the expansion valve may be repeated at substantially regular intervals. According to this embodiment, the opening degree of the expansion valve, and consequently the superheat value of the refrigerant leaving the evaporator, 'pulsates' with a substantially regular period. As an alternative, this period may be variable, e.g. depending on various operating conditions of the refrigeration system.

Alternatively or additionally, the period of time lapsing before the opening degree of the expansion valve is decreased may have a substantially constant length. According to this embodiment, the time interval during which the increased opening degree of the expansion valve is allowed to be maintained is substantially constant, and thereby limited. Consequently, the superheat value of the refrigerant leaving the evaporator is at the zero level only for a limited period of time, and the total amount of liquid refrigerant being allowed to pass through the evaporator is thereby limited to an amount which is not causing damage to the compressor. The period of time lapsing before the step of increasing the opening degree of the expansion valve is repeated may also have a substantially constant length, in which case the steps of increasing and decreasing the opening degree are repeated at substantially regular intervals as described above. However, the period of time lapsing before the step of increasing the opening degree of the expansion valve may, alternatively, have a variable length.

As an alternative, the period of time lapsing before the opening degree of the expansion valve is decreased may have a variable length, said variable length being determined on the basis of a measurement of the superheat value of the refrigerant. According to this embodiment, the superheat value of the refrigerant leaving the evaporator is preferably monitored. As described above, after the opening degree of the expansion valve has been increased, the superheat value of the refrigerant leaving the evaporator decreases to the zero level. When this is detected by the sensor used for monitoring the superheat value, the opening degree of the expansion valve is decreased to the previous opening degree, possibly after allowing a fixed time interval to lapse in order to allow the refrigerant to remain at the zero level for some time. The period of time lapsing before the step of increasing the opening degree of the expansion valve is repeated may by fixed or variable as described above. In the case that this period of time is variable, it may similarly be determined on the basis of a measurement of the superheat value of the refrigerant. In this case the opening degree of the expansion valve may advantageously be increased when it is detected that the superheat value has increased to a positive value. Thereby it is ensured that the superheat value is kept at the zero level for most of the time, while it is ensured that only a limited amount of liquid refrigerant is allowed to pass through the evaporator.

The method may further comprise the step of monitoring the superheat value of the refrigerant. This may be done by arranging a superheat sensor at or near the outlet of the evaporator. The superheat sensor may be of a kind which measures the temperature and the pressure of the refrigerant leaving the evaporator separately, or it may be of a kind which measures the superheat directly.

In this case the method may further comprise the step of delaying initiation of the step of increasing the opening degree of the expansion valve in the case that the step of monitoring the superheat value of the refrigerant reveals that the superheat remains at the zero level after the opening degree has been decreased. According to this embodiment the 'pulsating' period of the repetition of the increasing and decreasing steps and/or the period of time lapsing before the step of repeating the increasing step may advantageously be substantially constant under normal conditions. However, in the case that the measurement of the superheat value reveals that the superheat value does not increase to a positive value in response to decreasing the opening degree of the expansion valve, this is an indication that the average superheat value is too low, and there is therefore a risk that an excessive amount of liquid refrigerant is allowed to pass through the evaporator. In order to prevent this, the opening degree of the expansion valve is allowed to remain at the lower value for a longer period of time, e.g. for an additional period of the increasing/decreasing cycle. If the superheat value still remains at the zero value, the initiation of the step of increasing the opening degree of the expansion valve may be delayed even further, or the opening degree of the expansion valve may even be decreased.

Thus, the method may further comprise the step of decreasing the opening degree by an additional amount in the case that the step of monitoring the superheat value of the refrigerant reveals that the superheat remains at the zero level after the opening degree has been decreased.

In the case that the superheat value of the refrigerant leaving the evaporator is monitored, the method may comprise a 'tracking function' in the following sense. The superheat value may initially be relatively high, and increasing the opening degree of the expansion valve by a small amount will therefore not be sufficient to allow the superheat value to reach the zero level. Therefore, instead of decreasing the opening degree after the period of time has been allowed to lapse, the opening degree is once again increased by a small amount. This is repeated until the monitored superheat value reveals that the superheat value of the refrigerant leaving the evaporator has reached the zero level. Then the method is performed as described above, i.e. the opening degree of the expansion valve is 'pulsed'. This continues until it is detected that the superheat value of the refrigerant leaving the evaporator remains at the zero level after the opening degree of the expansion valve has been decreased. Then the initiation of the step of increasing the opening degree of the expansion valve is delayed, or the opening degree of the expansion valve is even decreased, as described above.

Alternatively or additionally, the method may comprise monitoring the superheat value of the refrigerant leaving the evaporator and determining if the superheat value is increasing or decreasing. If the monitored superheat value reveals that the superheat value is 'too high', i.e. it has not yet reached the zero level, even though the opening degree of the expansion valve has been increased, but that the superheat value is decreasing, then it may be decided to maintain the opening degree of the expansion valve at the current level, or even to decrease the opening degree of the expansion valve to allow it to 'pulsate' as described above. This is because the decreasing superheat value shows that the superheat value is 'on the right track'. The system comprises a certain 'inertia' in the sense that an increase in opening degree is reflected in a decrease in superheat value with some delay. Thus, the approach described above prevents the superheat value from decreasing so much that an excessive amount of liquid refrigerant is allowed to pass through the evaporator.

The steps of increasing and decreasing the opening degree of the expansion valve may be performed as a superposition on a hysteresis control strategy. According to this embodiment, the 'basic' opening degree of the expansion valve is controlled in accordance with a normal hysteresis control strategy. When the step of increasing the opening degree is performed, the opening degree is, thus, increased to a level which is higher than the opening degree which is dictated by the normal hysteresis control strategy. When the step of decreasing the opening degree of the expansion valve is performed, the opening degree is returned to the opening degree which is dictated by the hysteresis control strategy.

BRIEF DESCRIPTION OF THE DRAWINGS

The invention will now be described in further detail with reference to the accompanying drawings in which.

DETAILED DESCRIPTION

Figure 1:
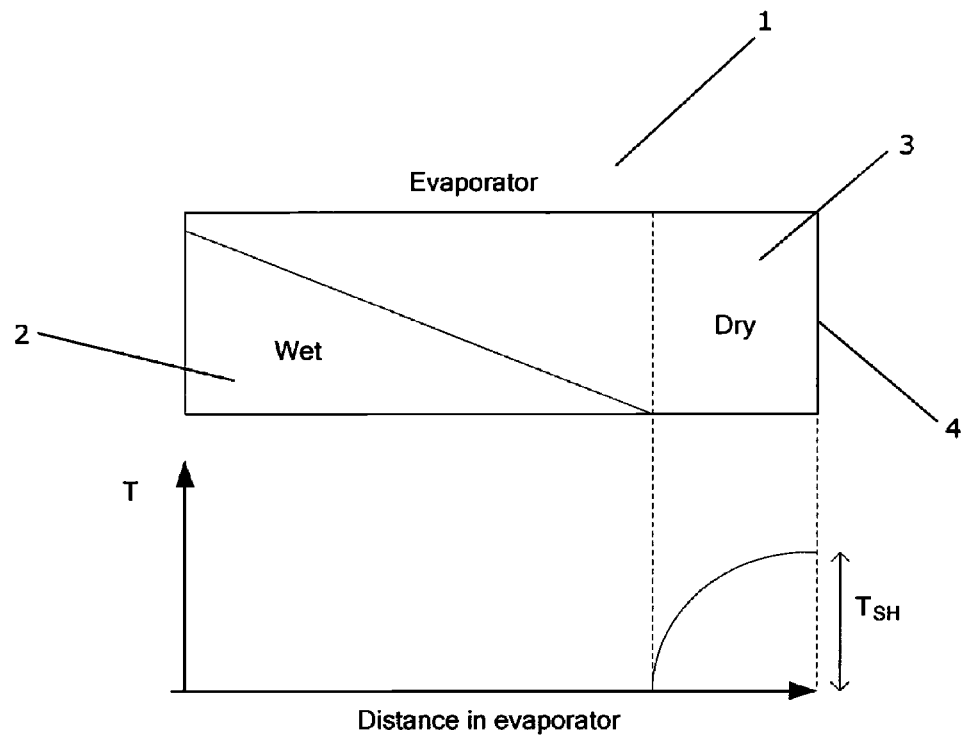
FIG. 1 illustrates an evaporator and the superheat value of the refrigerant as a function of position along the evaporator during normal operation.

FIG. 1 shows an evaporator 1 during operation of a refrigeration system. The evaporator 1 has a first region 2 and a second region 3. The first region 2 contains refrigerant in a liquid/mixed state, i.e. the refrigerant in the first region 2 of the evaporator 1 is either in a liquid phase or it is a mixture of liquid and gaseous refrigerant. The second region 3 contains refrigerant in a purely gaseous phase. Accordingly, evaporation of refrigerant takes place in the first region 2 of the evaporator 1, but not in the second region 3 of the evaporator 1, i.e. only the part of the evaporator 1 which corresponds to the first region 2 is actually utilised.

The graph shown below the evaporator 1 illustrates the superheat value of the refrigerant as a function of position along the evaporator 1. It can be seen that the superheat value is zero in the first region 2 of the evaporator 1. As soon as the boundary between the first region 2 and the second region 3 is reached, the superheat value 3 increases until the outlet opening 4 of the evaporator 1 is reached. As a consequence, the superheat value of the refrigerant leaving the evaporator 1 is relatively high in the situation illustrated in FIG. 1.

The superheat value of the refrigerant leaving the evaporator 1 can be reduced by moving the boundary between the first region 2 and the second region 3 towards the outlet opening 4 of the evaporator, i.e. by increasing the length of the first region 2 while decreasing the length of the second region 3. Ideally, the second region 3 should be completely eliminated, i.e. the first region 2 should extend substantially through the entire evaporator 1. However, as described above, care must be taken to prevent that liquid refrigerant in large amounts is allowed to pass through the evaporator 1.

Figure 2:
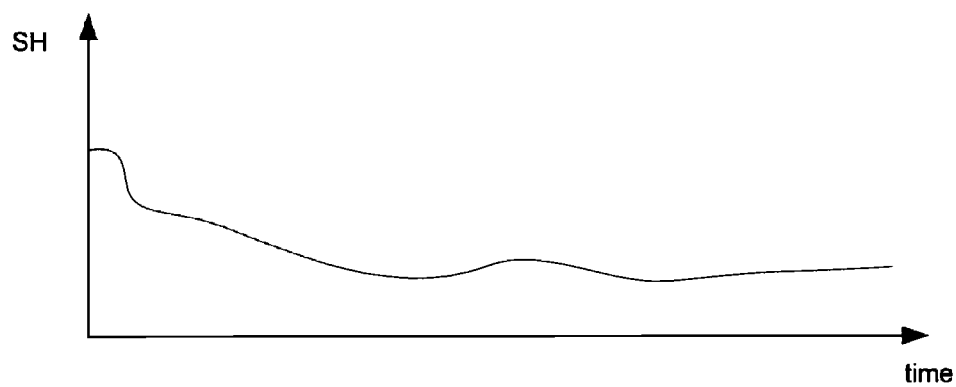
FIG. 2 shows superheat as a function of time when controlling the opening degree of an expansion valve using a prior art control strategy.

FIG. 2 is a graph showing superheat value of refrigerant leaving an evaporator as a function of time when the refrigeration system comprising the evaporator is operated using a prior art control strategy. It can be seen that the superheat value is initially relatively high, but it is gradually decreased to a substantially constant low, but positive, level.

Figure 3:
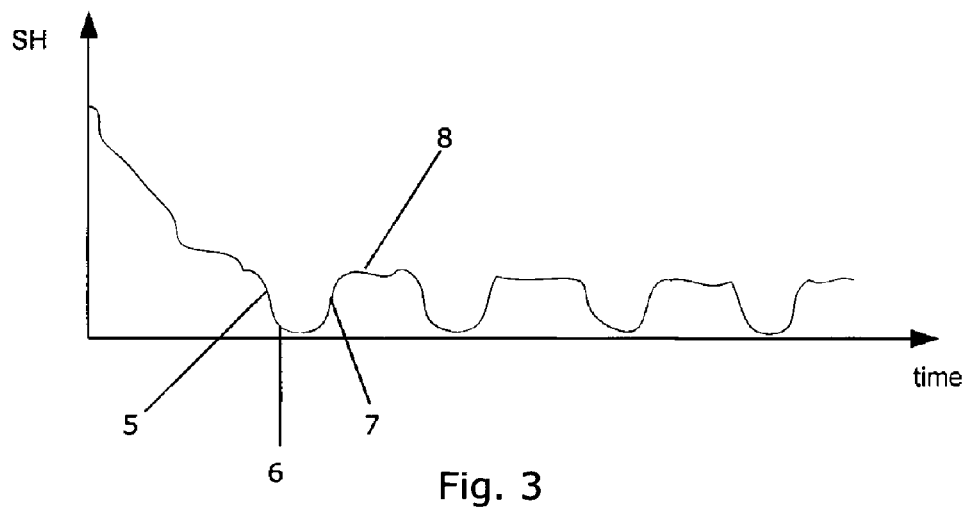
FIG. 3 shows superheat as a function of time when controlling the opening degree of an expansion valve using a method according to an embodiment of the present invention.

FIG. 3 is a graph showing superheat value of a refrigerant leaving an evaporator as a function of time. In the situation illustrated in FIG. 3 the flow of refrigerant to the evaporator is controlled in accordance with a method according to an embodiment of the invention. The superheat value is initially at a relatively high level and decreases to a low, but positive, level, similarly to the situation illustrated in FIG. 2. When the superheat value reaches the low, but positive, level, the steps of the method according to the invention are initiated. Accordingly, the opening degree of the expansion valve is increased, e.g. by approximately 10%. Thereby the supply of liquid refrigerant to the evaporator is increased, and, consequently, the boundary between the first region and the second region of the evaporator is moved towards the outlet opening of the evaporator. This causes the superheat value to decrease as illustrated at 5, and the superheat value eventually reaches the zero level at 6. At this point the first region extends through the entire length of the evaporator, i.e. liquid/mixed state refrigerant is present throughout the evaporator, and the dry zone of the evaporator has been eliminated.

After a period of time has lapsed the opening degree of the expansion valve is decreased, preferably to the opening degree of the expansion valve prior to initiating the increasing step. Thereby the supply of liquid refrigerant to the evaporator is decreased, and the boundary between the first region and the second region is once again moved away from the outlet opening, i.e. a dry region is re-established in the evaporator. This causes the superheat value of the refrigerant leaving the evaporator to increase, as illustrated at 7, until the superheat value reaches the low, but positive, level at 8.

The steps of increasing and decreasing the opening degree of the expansion valve are then repeated. It can be seen from the graph of FIG. 3 that this causes the superheat value to 'toggle' between the zero level and the low, but positive, level. Thereby the average superheat value is lower than the low, but positive, level, and the refrigerating capacity of the evaporator is therefore utilised more efficiently. However, it is still ensured that the amount of liquid refrigerant which is allowed to pass through the evaporator is sufficiently small to prevent damage to the compressor.

Figure 4:
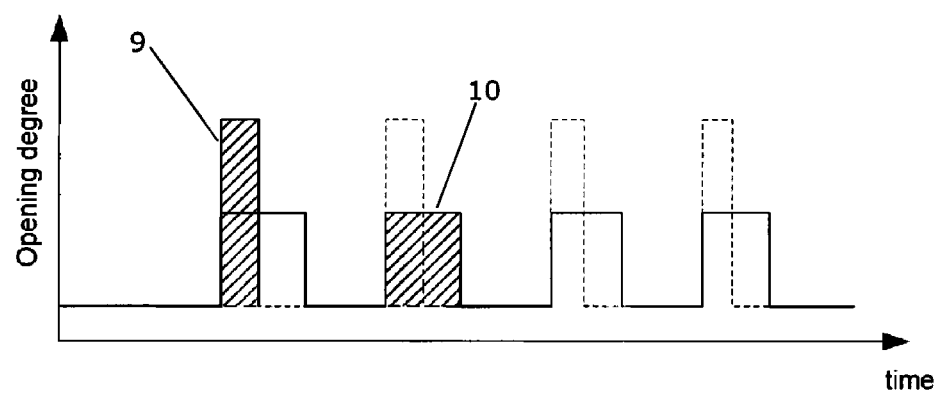
FIG. 4 illustrates opening degree of an expansion valve as a function of time for two different embodiments of the invention.

FIG. 4 is a graph illustrating opening degree of the expansion valve as a function of time for two different embodiments of the invention. According to the first embodiment 9, the opening degree is increased by a relatively large amount, and the opening degree is decreased after a short period of time. According to the second embodiment 10, the opening degree is increased by a somewhat smaller amount, approximately half the amount of the first embodiment 9. According to the second embodiment 10 a longer period of time lapses before the opening degree is decreased, approximately twice as long as the time lapsing according to the first embodiment 9. The total increase in liquid refrigerant supplied to the evaporator is approximately the same for the two embodiments 9, 10. This is illustrated by the areas of the hatched parts.

Figure 5:
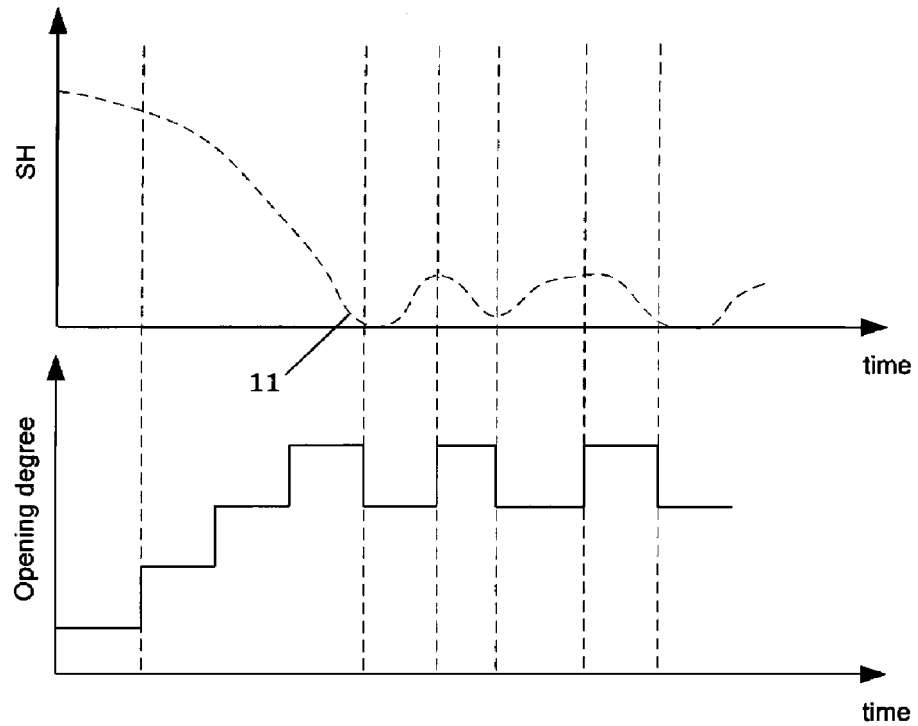
FIG. 5 illustrates superheat and opening degree of an expansion valve as a function of time for another embodiment of the invention.

FIG. 5 illustrates superheat and opening degree of an expansion valve as a function of time for another embodiment of the invention. Initially, the superheat value of the refrigerant leaving the evaporator is relatively high, indicating that a relatively long portion of the evaporator contains purely gaseous refrigerant. The opening degree of the expansion valve is increased in order to cause a decrease in superheat. It can be seen that the increase in opening degree has the desired effect on the superheat, i.e. the superheat value decreases, but not sufficiently to reach the zero value. Therefore the opening degree of the expansion valve in increased once again, causing the superheat value to decrease even further, but still not sufficiently to reach the zero level. The opening degree of the expansion valve is then repeatedly increased until the superheat value substantially reaches the zero level at 11. When a period of time has lapsed after the last increase of the opening degree of the expansion valve, the opening degree is decreased in accordance with the method of the present invention. The opening degree of the expansion valve is then 'pulsated' as described above, thereby causing the superheat value to 'toggle' between the zero level and the low, but positive, level.

Figure 6:
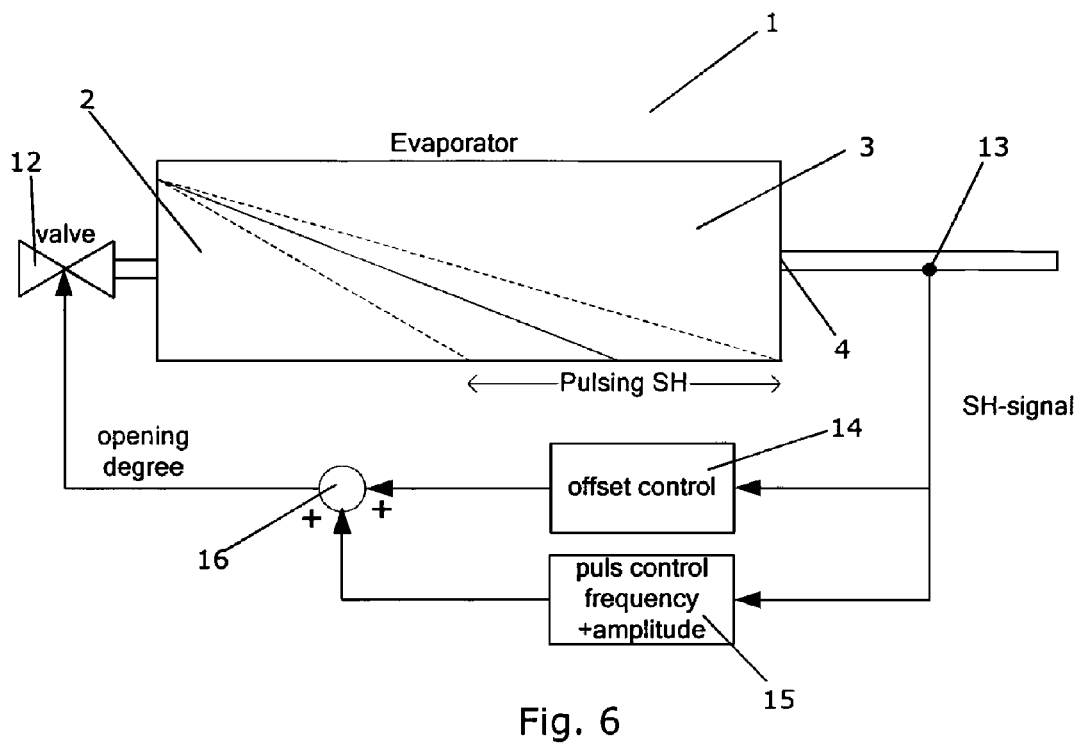
FIG. 6 is a schematic illustration of a control system for controlling a flow of refrigerant to an evaporator according to an embodiment of the invention.

FIG. 6 shows an evaporator 1 arranged in a refrigeration system. An expansion valve 12 controls the flow of liquid refrigerant supplied to the evaporator 1. The opening degree of the expansion valve 12 is controlled on the basis of measurements of the superheat value of the refrigerant leaving the evaporator 1 via the outlet 4. The superheat value is measured by means of a superheat sensor 13. The superheat sensor 13 supplies a signal to an offset controller 14, the offset controller 14 generating an offset control signal which depends on the load on the refrigeration system. The superheat sensor 13 further supplies a signal to a pulse controller 15, the pulse controller 15 generating an pulse control signal comprising information regarding the desired frequency as well as the desired amplitude of the pulsed part of the increase/decrease of the opening degree of the expansion valve 12. The offset control signal and the pulse control signal are added by means of calculation unit 16. The calculation unit 16 supplies a control signal to the expansion valve 12, the control signal containing the offset part as well as the pulsed part. The opening degree of the expansion valve 12 is then controlled in accordance with the control signal.

In FIG. 6 it is illustrated that the boundary between the first region 2 and the second region 3 is moved between two extreme positions as a consequence of the pulsed part of the control signal. In one of the extreme positions the boundary has been moved to the position of the outlet 4 of the evaporator 1, i.e. the superheat value of the refrigerant leaving the evaporator 1 is zero as described above. In the other extreme position the second region 3 takes up approximately half of the length of the evaporator 1, i.e. the superheat value of the refrigerant leaving the evaporator 1 is relatively high.

While the present invention has been illustrated and described with respect to a particular embodiment thereof, it should be appreciated by those of ordinary skill in the art that various modifications to this invention may be made without departing from the spirit and scope of the present.

What is claimed is:

1. A method for controlling a flow of refrigerant to an evaporator arranged in a refrigeration system, the refrigeration system further comprising an expansion valve and a compressor, the expansion valve, the evaporator and the compressor being arranged in a refrigerant flow path having refrigerant flowing therein, the method comprising the steps of:
    increasing an opening degree of the expansion valve, thereby increasing a flow of refrigerant to the evaporator sufficiently to substantially eliminate a dry zone of the evaporator so that a superheat value of the refrigerant leaving the evaporator is zero,
    decreasing the opening degree of the expansion valve after a period of time has lapsed,
    wherein the period of time lapsing before the opening degree of the expansion valve is decreased has a variable length, the variable length being determined on the basis of a measurement of the superheat value of the refrigerant;
    wherein the measurement of the superheat value detects whether the superheat value decreases to a zero level, and if so, the opening degree of the expansion valve is decreased;
    wherein the measure of the superheat value also detects whether the superheat value increases to a positive value, and if so, the opening degree of the expansion valve is increased; and
    repeating the steps of increasing and decreasing the opening degree of the expansion valve.

2. The method according to claim 1, wherein the steps of increasing and decreasing the opening degree of the expansion valve are repeated at substantially regular intervals.

3. The method according to claim 1, wherein the period of time lapsing before the opening degree of the expansion valve is decreased has a substantially constant length.

4. The method according to claim 1, further comprising the step of delaying initiation of the step of increasing the opening degree of the expansion valve in the case that the step of monitoring the superheat value of the refrigerant reveals that the superheat remains at the zero level after the opening degree has been decreased.

5. The method according to claim 1, further comprising the step of decreasing the opening degree by an additional amount in the case that the step of monitoring the superheat value of the refrigerant reveals that the superheat remains at the zero level after the opening degree has been decreased.

6. The method according to claim 1, wherein a basic opening degree of the expansion valve is controlled in accordance with a hysteresis control strategy; and wherein the steps of increasing and decreasing the opening degree of the expansion valve are performed as a superposition on the hysteresis control strategy in which the step of increasing the opening degree increases the opening degree to a level that is higher than the basic opening degree dictated by the hysteresis control strategy and the step of decreasing the opening degree returns the opening degree to the basic opening degree dictated by the hysteresis control strategy.

* * * * *